June 10, 1941.    H. W. SIMPSON    2,245,449
CLUTCH THROWOUT MECHANISM
Original Filed Oct. 30, 1939    3 Sheets-Sheet 1
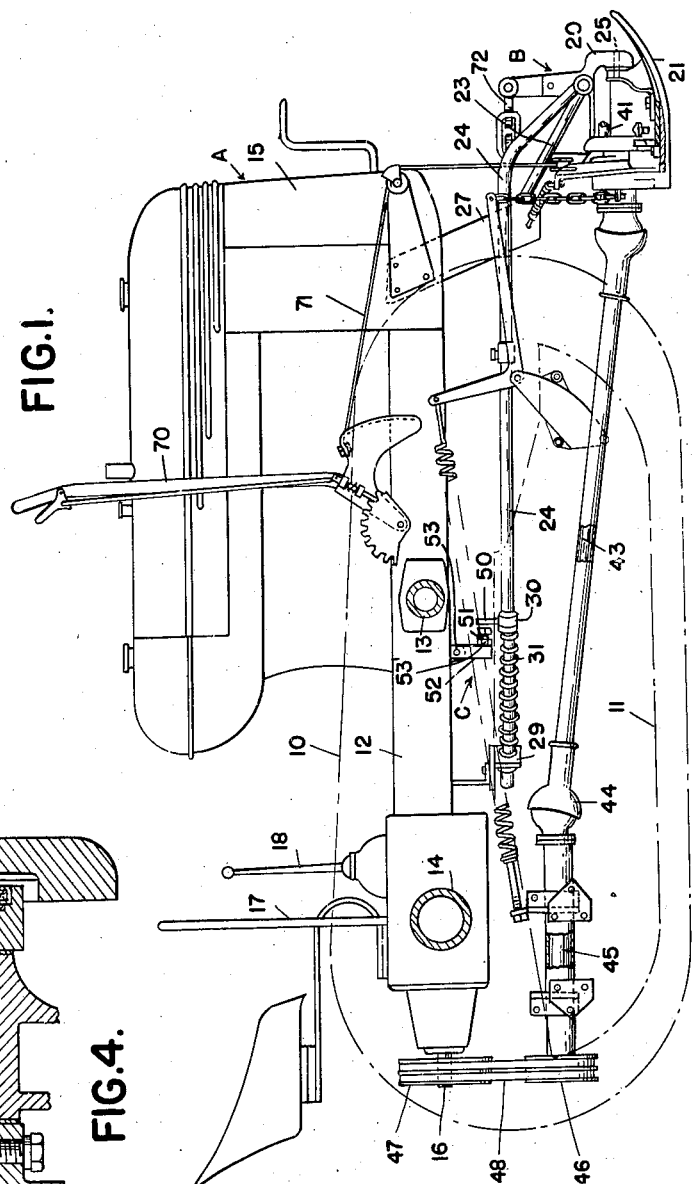
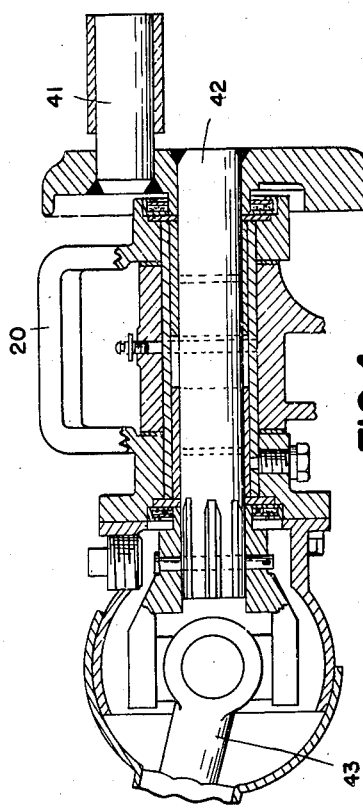
INVENTOR.
HOWARD W. SIMPSON
BY
ATTORNEYS

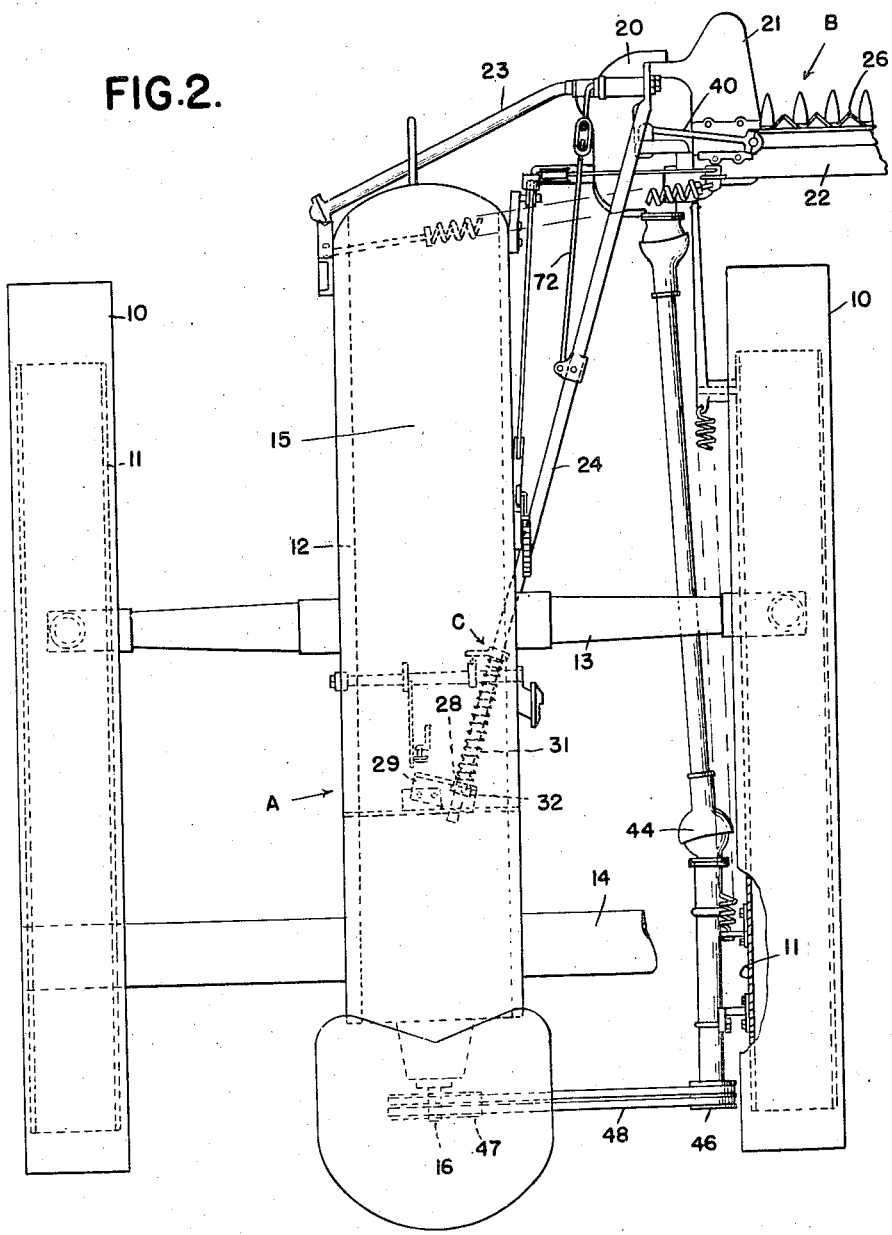

June 10, 1941.　　　H. W. SIMPSON　　　2,245,449
CLUTCH THROWOUT MECHANISM
Original Filed Oct. 30, 1939　　3 Sheets-Sheet 3

INVENTOR.
HOWARD W. SIMPSON
BY
ATTORNEYS

UNITED STATES PATENT OFFICE 2,245,449

CLUTCH THROWOUT MECHANISM

Howard W. Simpson, Dearborn, Mich., assignor to Detroit Harvester Company, Detroit, Mich., a corporation of Michigan Original application October 30, 1939, Serial No. 302,043. Divided and this application March 4, 1940, Serial No. 322,249

18 Claims. (Cl. 56—25)

This invention relates generally to tractor-mower assemblies and constitutes a division of my application filed October 30, 1939, bearing Serial No. 302,043.

One of the essential objects of the invention is to provide an efficient means effective automatically when the cutter bar of the mower assembly encounters or strikes any obstacle or obstruction to disengage the clutch of the tractor so as to arrest movement of the tractor.

Another object is to provide a clutch throwout mechanism of the type mentioned that includes as a part thereof one of the main supporting bars for the mower assembly.

Another object is to provide a clutch throwout mechanism wherein means associated with the supporting bar just mentioned normally maintains the throwout inoperative but is yieldable when the cutter bar strikes an obstruction to permit actuation of the clutch throwout as aforesaid.

Another object is to provide a clutch throwout that may be released by hand to permit re-engagement of the clutch after the gear shift lever of the tractor has been shifted into neutral or into reverse.

Other objects, advantages and novel details of construction of this invention will be made more apparent as this description proceeds, especially when considered in connection with the accompanying drawings, wherein:

Figure 1 is a side elevation partly in section showing the tractor-mower assembly;

Figure 2 is a top plan view with parts broken away of the same tractor-mower;

Figure 4 is a vertical section through the hinge bearing and crank shaft assembly;

Figure 3:
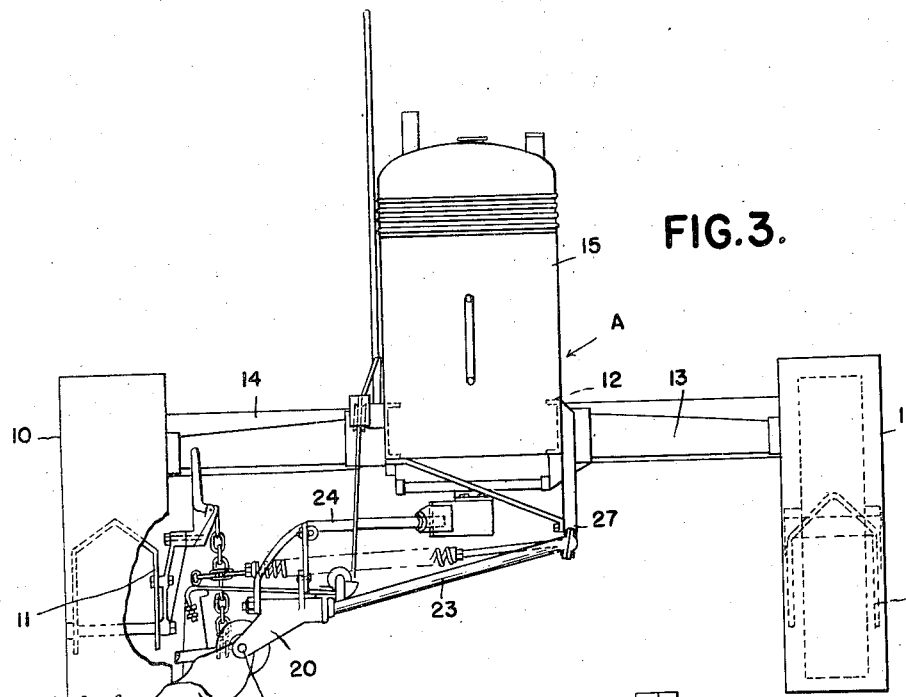
Figure 3 is a front elevation of the tractor-mower.
Figures 5, 6:
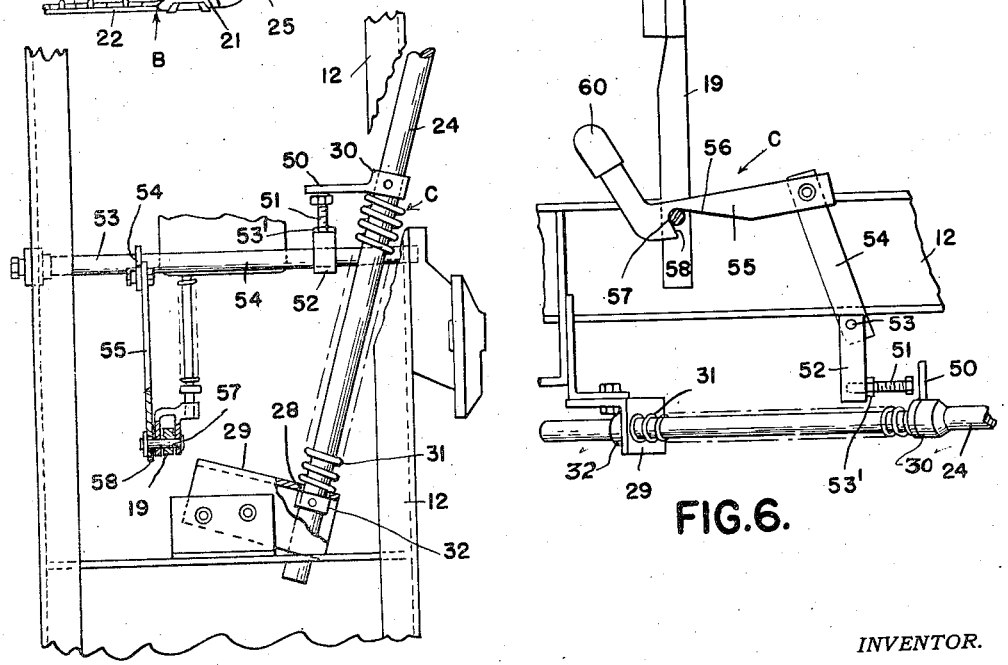
Figure 5 is a fragmentary plan view showing the clutch release mechanism.
Figure 6 is a fragmentary side elevation of the clutch release mechanism.

Referring now to the drawings, A is the tractor, B is the mower assembly, and C is the clutch throwout mechanism embodying my invention.

As shown, the tractor A is a crawler type and has a pair of laterally spaced, elongated, endless tracks 10 mounted on suitable frames 11. The main frame 12 of the tractor is between the track frames and is supported therefrom by a front axle housing 13 and a rear axle housing 14. On the main frame 12 at its forward end is a suitable internal combustion engine or motor 15 operatively connected to the endless tracks 10 for driving the tractor forwardly or rearwardly, and having at the rear end of the main frame a suitable power take-off shaft 16.

17 is the control lever for the usual steering brake of the tractor, 18 is the gear shift lever, and 19 is the conventional clutch pedal of the tractor. All of these elements and the mechanism operated thereby are standard or conventional parts of the tractor and therefore need not be described.

The mower assembly B preferably comprises a hinge bracket 20, a mower shoe 21, and a cutter bar 22. Preferably the bracket 20 is mounted for substantially vertical swinging movement relative to the tractor and is carried by two rods or bars 23 and 24, respectively, connected to the main frame 12 of the tractor. The mower shoe 21 is pivotally connected at 25 to the hinge bracket 20 and is rigidly secured to the cutter bar 22 at its inner end. In the present instance the cutter bar 22 is in advance of and extends laterally outward relative to the tractor. Preferably the cutter bar is in front of the right-hand track frame of the tractor and carries a reciprocating sickle bar 26 of suitable design.

To provide an efficient structure, the bar 23 extends transversely in front of the main frame of the tractor, while the bar 24 extends longitudinally of the main frame. One end of the bar 23 is journaled in the hinge bracket 20, while the other end thereof has a universal connection 26 with a bracket 27 depending from the main frame 12 at the side thereof remote to the cutter bar 22. The forward end of the bar 24 is pivotally connected to the bar 23 at one side of the hinge bracket 20, while the rear end of said bar 24 extends freely through an enlarged opening 28 in a supporting bracket 29 fixed to the main frame 12 at a point substantially midway between the front and rear axle housings 13 and 14. Preferably the opening 28 is of sufficient size to permit the bar 24 to pivot as well as slide relative to the bracket 29.

30 is a collar adjustably mounted on the bar 24 in spaced relation to the bracket 29, and 31 is a coiled spring sleeved on the bar 24 between the collar 30 and bracket 29. Thus, with this construction the coil spring 31 normally urges the bar 24 and mower assembly forward. Actually the spring 31 has sufficient strength to retain the mower assembly in its forward cutting position as determined by a stop element 32 on the bar 24 at the rear of the bracket 29. However, upon abnormal strain, such as would be caused by the mower assembly upon encountering an obstacle, the bar 24 will slide rearwardly in the bracket 29 against the tension of the spring 31.

For driving the sickle 26 I have provided a pitman 40 connected at one end to said sickle and at the other end thereof to a crank 41 of a shaft 42 journaled in the hinge bracket 20. Universally connected to the shaft 42 is a sectional propeller shaft 43 having a universal connection within the housing 44 with a countershaft 45. The sections of the propeller shaft 43 are preferably telescopically arranged with suitable splines therebetween to insure constant driving action while permitting relative longitudinal movement between the sections, for example, upon rearward movement of the mower assembly and bar 24 when an obstacle is encountered. Mounted on the countershaft 45 and power take-off shaft 16 are pulleys 46 and 47, respectively, over which a suitable drive belt 48 is trained. Thus, when the power take-off shaft 16 is in operation, the drive therefrom to the sickle bar 26 is via belt 48, shafts 45, 43 and 42, and pitman 40.

In order that the clutch of the tractor may be disengaged or thrown out automatically to arrest movement of the tractor when the cutter bar 22 encounters an obstacle, I have provided a rigid arm 50 on the collar 30 for engagement with an adjustable abutment 51 on the lower end of an arm 52 non-rotatively secured to a cross shaft 53. Preferably the abutment 51 is a bolt threadedly engaging the arm 52 and provided with a lock nut 53'. Normally the abutment 51 is adjusted so that there is a suitable clearance between the abutment and arm 50 on the collar 30. The cross shaft 53 may be journaled in any suitable manner in brackets fixed to the main frame 12. Also non-rotatively secured to the cross shaft 53 is another arm 54 which carries a substantially L-shaped arm 55 suitably notched as at 56 for engagement with a lateral pin 57 on the clutch pedal 19. Thus, when the bar 24 slides rearwardly following an encounter of the cutter bar 22 with an obstacle the arm 50 carried by collar 30 will strike abutment 51 and cause arm 52, shaft 53 and arm 54 to move in a clockwise direction. This in turn will cause arm 55 to move forwardly so that the shoulder 58 of notch 56 will, through engagement with lateral pin 57, depress the clutch pedal 19 and thereby cause the clutch of the tractor to be thrown out so that forward movement of the tractor will be arrested. The gear shift lever 18 of the tractor may then be shifted into neutral or into reverse, as desired.

In order that the clutch of the tractor may be re-engaged after the gear shift lever 18 of the tractor has been placed in neutral or in reverse, a handle or hand grip 60 is provided on the upstanding part of the L-shaped arm 55 so that it may be used to move the arm 55 to disengage the shoulder 58 of the notch 56 from the pin 57 on the clutch pedal 19 and thus release the latter.

In view of the foregoing, it will be apparent that I have provided an inexpensive and efficient structure wherein the bar 24 not only serves as a supporting member for the mower assembly but also cooperates with the spring 31 to cushion the shock resulting from an encounter between the mower bar 22 and an obstruction, and cooperates with the arms 50, 52, 54 and 55, respectively, for throwing out the clutch of the tractor when such obstruction is encountered. This bar 24 permits movement of a lever 70 and cable 71 in the usual manner to swing the cutter bar 22 and associated parts from a horizontal to a vertical position relative to the tractor, and also permits adjustment of a rod 72 and associated parts to effect rocking or tilting movement of the cutter bar 22 relative to the ground. The spring 31 which serves to cushion the shocks mentioned normally holds the clutch throwout arm 50 in an inoperative position, but is yieldable when an obstruction is encountered to permit operation thereof, as aforesaid. The clutch pedal 19 may be easily and quickly released from the throwout mechanism by manipulation of the handle 60 to permit the clutch of the tractor to be re-engaged.

What I claim as my invention is:

1. In a mowing machine, the combination with a tractor having a clutch actuating member, a mower assembly comprising a mower shoe and a mower arm carried by said shoe, and means for supporting the mower assembly from the tractor for both vertical and horizontal swinging movement comprising a hinge bracket connected to the shoe, a transversely extending rod connected to the bracket and universally connected to the tractor, and a longitudinally extending rod connected to the bracket and slidably connected to the tractor; of means operable by the mower assembly for actuating the clutch member, including an element adjustably mounted on the longitudinally extending rod, a series of arms connected to the clutch member, and an abutment for the adjustable element carried by one of the arms of the series and normally free and clear of said element, said abutment being also free and clear of said element during vertical swinging movement of the mower assembly but operable by said element during horizontal swinging movement of the mower assembly.

2. In a mowing machine, the combination with a tractor having a clutch actuating member, a mower assembly comprising a mower shoe and a mower arm carried by said shoe, and means for supporting the mower assembly from the tractor for both vertical and horizontal swinging movement comprising a hinge bracket connected to the shoe, a transversely extending rod connected to the bracket and universally connected to the tractor, and a longitudinally extending rod connected to the bracket and slidably connected to the tractor; of means operable by the mower assembly for actuating the clutch member, including an element adjustably mounted on the longitudinally extending rod, a series of arms connected to the clutch member, one arm of the series having a hooked engagement with the clutch member, and an abutment for the adjustable element carried by another of the arms of the series and normally free and clear of said element, said abutment being also free and clear of said element during vertical swinging movement of the mower assembly but operable by said element during horizontal swinging movement of the mower assembly, the hooked arm having a handle portion by which it may be manually operated when it is desired to disengage entirely said hooked arm from the clutch member to free the clutch member.

3. In a mowing machine, a tractor having a clutch pedal, a mower assembly adjacent the tractor, means for supporting the mower assembly for both vertical and horizontal swinging movement relative to the tractor, said means including a rod extending longitudinally of the tractor and slidably connected thereto, an element mounted on said rod, a series of arms carried by the tractor for actuating the clutch pedal, and an abutment for the element carried by one of said arms and normally free of said element, said abutment being also free and clear of said element during vertical swinging movement of the mower assembly but operable by said element during horizontal swinging movement of the mower assembly.

4. In a mowing machine, a tractor having a clutch actuating member, a mower assembly adjacent the tractor, means for supporting the mower assembly for both vertical and horizontal swinging movement relative to the tractor, said means including a rod extending longitudinally of the tractor and slidably connected thereto, an element mounted on said rod, a series of arms carried by the tractor for actuating the clutch member, an abutment for the element carried by one of said arms, and means maintaining the element free and clear of the abutment during vertical swinging movement of the mower assembly but yieldable during horizontal swinging movement of the mower assembly to permit said element to engage said abutment.

5. In a mowing machine, a tractor having a clutch actuating member, a mower assembly adjacent the tractor, means for supporting the mower assembly for both vertical and horizontal swinging movement relative to the tractor, said means including a rod extending longitudinally of the tractor and slidably connected thereto, a collar sleeved on said rod and having a rigid arm, a series of arms carried by the tractor for actuating the clutch member, and an abutment for said rigid arm carried by one of the arms of the series, said abutment being adjustable so that it will be free and clear of the rigid arm during vertical swinging movement of the mower assembly but operable by said rigid arm during horizontal swinging movement of the mower assembly.

6. In a mowing machine, a tractor having a clutch actuating member, a mower assembly adjacent the tractor, means for supporting the mower assembly for both vertical and horizontal swinging movement relative to the tractor, said means including a rod extending longitudinally of the tractor and slidably connected thereto, an element carried by said rod, cooperating members carried by the tractor for actuating the clutch member, one of said cooperating members being connected to said clutch member, an abutment for the element carried by another of said cooperating members, and spring means maintaining the element free and clear of the abutment during vertical swinging movement of the mower assembly but yieldable during horizontal swinging movement of the mower assembly to permit said element to engage said abutment.

7. In a mowing machine, a tractor having a clutch actuating member, a mower assembly adjacent the tractor, means for supporting the mower assembly for both vertical and horizontal swinging movement relative to the tractor, said means including a rod extending longitudinally of the tractor and slidably connected thereto, an element carried by said rod, cooperating members carried by the tractor for actuating the clutch member, said clutch member being provided with a laterally projecting pin, one of the cooperating members having a notch normally receiving the pin and having a handle portion by which said member may be manipulated to disengage the notch and pin, and an abutment for the element carried by another of said cooperating members, said abutment being normally free and clear of the element to permit vertical swinging movement of the mower assembly without contact between the element and abutment, said abutment being in the path of the element to be engaged thereby during horizontal swinging movement of the mower assembly.

8. In a mowing machine, the combination with a tractor having a clutch pedal, a mower assembly comprising a mower shoe and a mower arm carried by said shoe, and means for supporting the mower assembly from the tractor for vertical and horizontal swinging movement comprising a hinge bracket connected to the shoe, a transversely extending rod connected to the bracket and universally connected to the tractor, and a longitudinally extending rod connected to the bracket and slidably connected to the tractor; of a striker element on the longitudinally movable rod, a series of cooperating members carried by the tractor for actuating the clutch pedal, one of said members being detachably connected to the clutch pedal, an abutment for the striker element carried by another of said cooperating members, and means engaging said striker element and normally holding it free and clear of the abutment so that there will be no contact between the striker element and abutment during vertical swinging movement of the mower assembly, said means being yieldable to permit such contact during horizontal swinging movement of the mower assembly.

9. In a mowing machine, the combination with a tractor having a clutch actuating member, a mower assembly comprising a mower shoe and a mower arm carried by said shoe, and means for supporting the mower assembly from the tractor for both vertical and horizontal swinging movement comprising a hinge bracket connected to the shoe, a transversely extending rod connected to the bracket and universally connected to the tractor, and a longitudinally extending rod connected to the bracket and slidably connected to the tractor; of a striker element on the longitudinally movable rod, a series of cooperating members for actuating the clutch member, one of said cooperating members having a notch and pin connection with the clutch member, and an abutment for the striker element carried by another of said cooperating members, both the striker element and abutment being adjustable relative to each other so that the abutment is normally free and clear of the striker element, the abutment being engageable by the striker element during horizontal swinging movement of the mower assembly.

10. In a mowing machine, the combination with a tractor having a clutch actuating member, a mower assembly comprising a mower shoe and mower arm carried by said shoe, and means for supporting the mower assembly from the tractor for both vertical and horizontal swinging movement comprising a hinge bracket connected to the shoe, a transversely extending rod connected to the bracket and universally connected to the tractor, and a longitudinally extending rod connected to the bracket and slidably connected to the tractor; of a striker element on the longitudinally extending rod, and manually operable means entirely separate from and free and clear of said element for actuating said clutch member, said means including a member in the path of and operable automatically by said element during horizontal swinging movement of the mower assembly, said last mentioned member being out of the path of said striker element during vertical swinging movement of the mower assembly.

11. In a mowing machine, the combination with a tractor having a clutch actuating member, a mower assembly comprising a mower shoe and a mower arm carried by said shoe, and means for supporting the mower assembly from the tractor for both vertical and horizontal swinging movement comprising a hinge bracket connected to the shoe, a transversely extending rod connected to the bracket and universally connected to the tractor, and a longitudinally extending rod connected to the bracket and slidably connected to the tractor; of a striker element on the longitudinally extending rod, a series of cooperating members carried by the tractor for actuating the clutch member, one of said cooperating members having a notch and pin connection with the clutch member and having a handle by which it may be disengaged from the clutch member, and an abutment for said striker element carried by another of said cooperating members, said abutment being normally free and clear of the striker element but engageable thereby during horizontal swinging movement of the mower assembly.

12. In a mowing machine, a tractor having a clutch actuating member, a mower assembly supported from the tractor so as to swing vertically and horizontally relative thereto, the support for the mower assembly including a rod extending from the mower assembly to a point adjacent the clutch actuating member of the tractor, and means operable by the mower assembly for actuating the clutch member, including an element adjustably mounted on said rod, a series of arms operatively connected to the clutch member, and an abutment for the adjustable element carried by one of the arms of the series and normally free and clear of said element, said abutment being also free and clear of said element during vertical movement of the mower assembly but operable by said element during horizontal movement of the mower assembly.

13. In a mowing machine, a tractor having a clutch actuating member, a mower assembly supported from the tractor so as to swing vertically and horizontally relative thereto, the support for the mower assembly including a rod extending from the mower assembly to a point adjacent the clutch actuating member of the tractor, and means operable by the mower assembly for actuating the clutch member, including an element adjustably mounted on said rod, a series of arms between the clutch member and element, one arm of the series having a hooked engagement with the clutch member, and an abutment for the adjustable element carried by another of the arms of the series and normally free and clear of said element, said abutment being also free and clear of said element during vertical movement of the mower assembly but operable by said element during horizontal movement of the mower assembly, the hooked arm having a handle portion by which it may be manually operated when it is desired to disengage entirely said hooked arm from the clutch member to free the same.

14. In a mowing machine, a tractor having a clutch actuating member, a mower assembly supported from the tractor so as to swing vertically and horizontally relative thereto, the support for the mower assembly including a rod extending from the mower assembly to a point adjacent the clutch actuating member of the tractor, and means operable by the mower assembly for actuating the clutch member, including an element mounted on said rod, a series of arms extending between the clutch member and element, one of said arms being detachably connected to the clutch member, and an abutment for said element adjustably mounted on another of said arms, said abutment being normally spaced from the element so that the abutment will be free of said element when the mower assembly swings vertically, said abutment being in the path of and engageable by said element when the mower assembly swings horizontally.

15. In a mowing machine, a tractor having a clutch actuating member, a mower assembly supported from the tractor so as to swing vertically and horizontally relative thereto, the support for the mower assembly including a rod extending from the mower assembly to a point adjacent the clutch actuating member of the tractor, and means operable by the mower assembly for actuating the clutch member, including an element mounted on said rod, a lever arm detachably connected to the clutch member, and an abutment for said element operatively connected to said lever arm, said abutment being normally spaced from the element so that the abutment will be free of said element when the mower assembly swings vertically, said abutment being in the path of and engageable by said element when the mower assembly swings horizontally.

16. In a mowing machine, a tractor having a clutch actuating member, a mower assembly adjacent the tractor, means for supporting said mower assembly from the tractor so as to swing vertically and horizontally relative thereto, the horizontal swinging movement of the mower assembly being forwardly and rearwardly relative to the tractor, said supporting means including a rod extending between and connected to the mower assembly and tractor, said rod being slidable forwardly and rearwardly relative to the tractor during forward and rearward horizontal movement of the mower assembly, and means operable by the mower assembly for actuating the clutch member, including an arm projecting from the rod, and an abutment for said arm operatively connected to said clutch member and normally free and clear of said arm, said abutment being also free and clear of said arm during vertical movement of the mower assembly but operable by said arm when the rod aforesaid slides rearwardly during rearward horizontal movement of the mower assembly relative to the tractor.

17. In a mowing machine, a tractor having a clutch actuating member, a mower assembly adjacent the tractor, means for supporting said mower assembly from the tractor so as to swing vertically and horizontally relative thereto, the horizontal swinging movement of the mower assembly being forwardly and rearwardly relative to the tractor, said supporting means including a rod extending between and connected to the mower assembly and tractor, said rod being slidable forwardly and rearwardly relative to the tractor during forward and rearward horizontal movement of the mower assembly, and means operable by the mower assembly for actuating the clutch member, including an arm projecting from the rod, a series of arms operatively connected to the clutch member, and an abutment for the arm projecting from the rod carried by one arm of the series and normally free and clear of the arm projecting from the rod, said abutment being also free and clear of the arm on the rod during vertical movement of the mower assembly but operable by said arm when the rod slides rearwardly during rearward horizontal movement of the mower assembly relative to the tractor.

18. In a mowing machine, a tractor having a clutch actuating member, a mower assembly adjacent the tractor, means for supporting said mower assembly from the tractor so as to swing vertically and horizontally relative thereto, the horizontal swinging movement of the mower assembly being forwardly and rearwardly relative to the tractor, said supporting means including a rod extending between and connected to the mower assembly and tractor, said rod being slidable forwardly and rearwardly relative to the tractor during forward and rearward horizontal movement of the mower assembly, and means operable by the mower assembly for actuating the clutch member, including an arm projecting from the rod, a series of arms between the arm on the rod and the clutch member, and an abutment for the arm projecting from the rod carried by one arm of the series and normally free and clear of the arm projecting from the rod, another arm of the series being detachably connected to the clutch member, the arm on the rod and the abutment therefor being relatively adjustable, said abutment being also free and clear of the arm on the rod during vertical movement of the mower assembly but operable by said arm when the rod slides rearwardly during rearward horizontal movement of the mower assembly relative to the tractor.

HOWARD W. SIMPSON.